US012651045B2

(12) United States Patent
Charania et al.

(10) Patent No.: US 12,651,045 B2
(45) Date of Patent: Jun. 9, 2026

(54) SYSTEM AND METHOD FOR IDENTIFYING APPROXIMATE K-NEAREST NEIGHBORS IN WEB SCALE CLUSTERING

(71) Applicant: YAHOO ASSETS LLC, Dulles, VA (US)

(72) Inventors: Faizaan Charania, Mountain View, CA (US); Erik Ordentlich, San Jose, CA (US)

(73) Assignee: YAHOO ASSETS LLC, Dulles (VA)

( * ) Notice: Subject to any disclaimer, the term of this patent is extended or adjusted under 35 U.S.C. 154(b) by 1154 days.

(21) Appl. No.: 17/344,694

(22) Filed: Jun. 10, 2021

(65) Prior Publication Data

US 2022/0398416 A1     Dec. 15, 2022

(51) Int. Cl.
*G06F 18/2413*     (2023.01)
*G06F 18/2321*     (2023.01)
*G06F 18/23213*    (2023.01)

(52) U.S. Cl.
CPC .... *G06F 18/24147* (2023.01); *G06F 18/2321* (2023.01); *G06F 18/23213* (2023.01)

(58) Field of Classification Search
CPC ......... G06F 18/24147; G06F 18/23213; G06F 18/2321

See application file for complete search history.

(56) References Cited

U.S. PATENT DOCUMENTS 7,117,185 B1    10/2006  Aliferis et al.
11,151,250 B1   10/2021  Chang et al.

2013/0230255 A1*   9/2013  Wang ..................... G06F 16/583
                                                              382/201
2015/0178405 A1*   6/2015  Hong .................. G06F 16/9024
                                                              707/798
2019/0042893 A1*   2/2019  Kafai .................. G06F 18/2323
2019/0050672 A1*   2/2019  Shang ..................... G06F 16/00
2021/0157851 A1*   5/2021  Aoyama .......... G06F 18/24147

OTHER PUBLICATIONS

Yingyi Bu, Bill Howe, Magdalena Balazinska, and Michael D. Ernst. 2010. HaLoop: efficient iterative data processing on large clusters. Proc. VLDB Endow. 3, Sep. 1-3, 2010, 285-296. https://doi.org/10.14778/1920841.1920881 (Year: 2010).*

(Continued)

*Primary Examiner* — Michael H Hoang

(74) *Attorney, Agent, or Firm* — VENABLE LLP

(57)          ABSTRACT

The present teaching relates to method, system, medium, and implementations for identifying k nearest neighbors. A plurality of combined neighborhoods are received from a plurality of local join executors. Each combined neighborhood represents a neighborhood of a source data point and has one or more pairs of neighbors, each of which includes the source data point, a neighbor of the source point, and a distance in-between. A plurality of KNN lists corresponding to a plurality of source data points are obtained. Each KNN list includes K neighbors to a corresponding source data point, each of which is represented by an index of the neighbor and a distance between the source data point and the neighbor. The plurality of KNN lists are updated based on the plurality of combined neighborhoods to generate updated KNN lists.

17 Claims, 13 Drawing Sheets

(56)           References Cited

OTHER PUBLICATIONS

ListDiff. "ListDiff—Compare multiple lists to find list differences". Webpage snapshot taken May 9, 2021 by the WayBack Machine. Retrieved from: <https://web.archive.org/web/20210509204528/http://www.listdiff.com/#expand>. (Year: 2021).*

Bhattacharjee, Panthadeep, and Pinaki Mitra. "BISDBx: towards batch-incremental clustering for dynamic datasets using SNN-DBSCAN." Pattern Analysis and Applications 23.2 (2020): 975-1009. https://link.springer.com/article/10.1007/s10044-019-00831-1 (Year: 2020).*

Xia, Chenyi, et al. "BORDER: efficient computation of boundary points." IEEE Transactions on Knowledge and Data Engineering 18.3 (2006): 289-303. https://ieeexplore.ieee.org/stamp/stamp.jsp?tp=&arnumber=1583580 (Year: 2006).*

Office Action mailed Dec. 18, 2023 in U.S. Appl. No. 18/297,139.

Campello et al., "Density-Based Clustering Based on Hierarchical Density Estimates", Dept. of Computing Science, University of Alberta, Edmonton, AB, Canada, pp. 160-172, 2013 (13 Pages).

Charania et al., "Web scale clustering with S-HDBSCAN", Big-ML Platforms Group (7 Pages).

Notice of Allowance mailed Dec. 1, 2022 in U.S. Appl. No. 17/344,652.

Office Action mailed Aug. 22, 2025 in U.S. Appl. No. 18/794,335.

Hammad, "Implementation of a Parallel K-Nearest Neighbor Algorithm Using MPI", Central European Researchers Journal, 2019, pp. 1-10, vol. 5, Issue 1, CERES.

Zhang et al., "A Distributed Storage and Computation k-Nearest Neighbor Algorithm Based Cloud-Edge Computing for Cyber-Physical-Social Systems", Special Section On Cloud—FOG—Edge Computing in Cyber-Physical-Social Systems (CPSS), Mar. 20, 2020, pp. 50118-50130, vol. 8, IEEE Access.

* cited by examiner

| Index 1 | Distance 1 | BV 1 |
| Index 2 | Distance 2 | BV 2 |
| Index 3 | Distance 3 | BV 3 |
| ------ | | ------ |
| | | |
| Index i | Distance i | BV i |
| Index j | Distance j | BV j |
| | | |
| ------ | | ------ |
| | | |
| Index K | Distance K | BV K |

Fig. 3

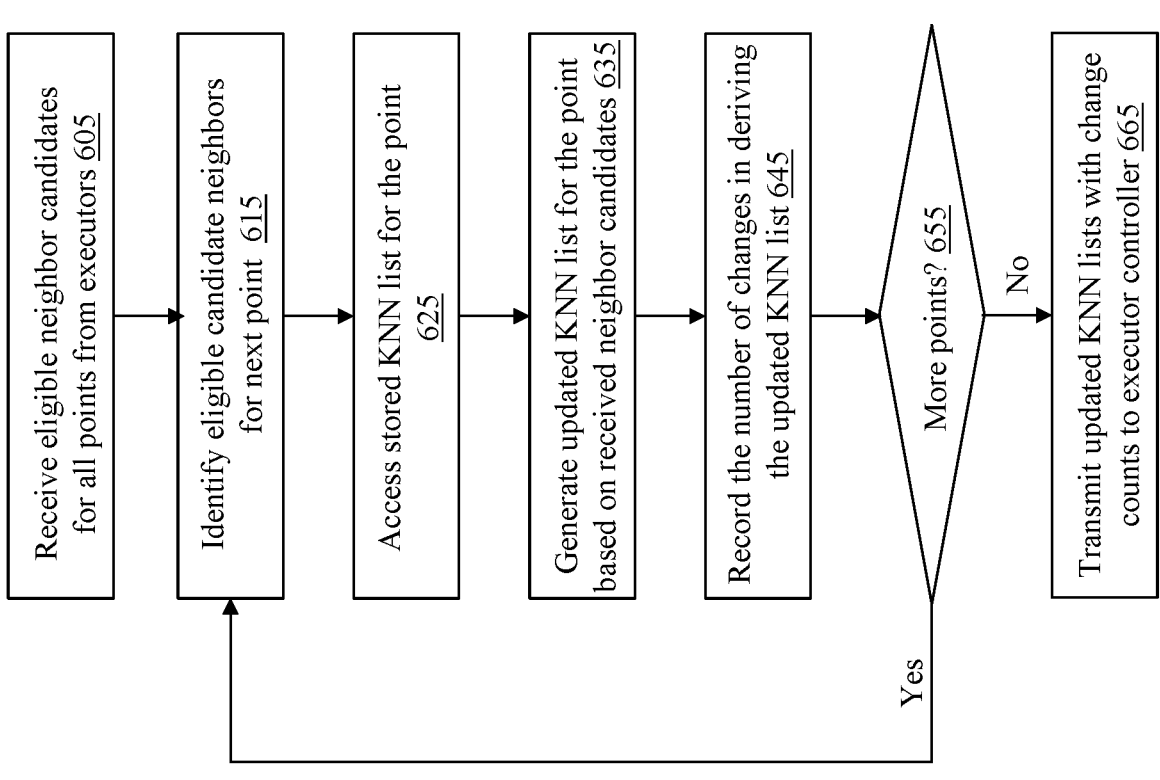

Receive eligible neighbor candidates for all points from executors 605

Identify eligible candidate neighbors for next point 615

Access stored KNN list for the point 625

Generate updated KNN list for the point based on received neighbor candidates 635

Record the number of changes in deriving the updated KNN list 645

More points? 655

Yes

No

Transmit updated KNN lists with change counts to executor controller 665

710 Communication Platform

Display 720

Memory 760

OS 770

App(s) 780

GPU 730

CPU 740

Storage 790

I/O 750

SYSTEM AND METHOD FOR IDENTIFYING APPROXIMATE K-NEAREST NEIGHBORS IN WEB SCALE CLUSTERING

CROSS-REFERENCE TO RELATED APPLICATIONS

The present application is related to U.S. patent application Ser. No. 17/344,652, filed Jun. 10, 2021, which is hereby incorporated by reference in its entirety.

BACKGROUND

1. Technical Field

The present teaching generally relates to computers. More specifically, the present teaching relates to information processing.

2. Technical Background

Clustering is a technique that has existed for some time for gaining insights from unlabeled data by forming groups of similar points with respect to some criteria. It has been used as a tool to make sense of the massive amounts of data that is continuously generated. Traditionally, criteria are determined based on application needs and similarities among data points are represented using, e.g., distances measured in some high dimensional space. In today's society where data is created constantly at an exponentially growing speed, the technique of clustering used for processing such data faces new challenges including how to scale.

In recent years, there is a rapid growth in machine learning, artificial intelligence (AI), and applications thereof. Traditionally, clustering is used for unsupervised learning and plays an important role in this wave of AI to make sense of the huge volume of unlabeled data. More advanced techniques have been developed in the last decade. For example, word2vec technique has been developed for learning embeddings based on textual information to capture, e.g., semantic relationships between entities in such textual information via geometric relationships between their corresponding embedding vectors. Proximity measured by some form of distance (e.g., Euclidean distance or angular distance) may be used to correspond closely to semantic proximity between the corresponding entities. Applying clustering to embeddings under such distance measures is thus an indirect way to cluster the entities based on semantic proximity, endowing the resulting clusters with semantic significance, and raising the machine learning applications of clustering to a whole new level of usefulness. Hierarchical density-based spatial clustering of applications with noise (HDBSCAN) is one of such state-of-the-art clustering approaches that has exhibited particularly promising characteristics. One of the key and most computationally expensive steps in such supervised learning via a clustering algorithm is computing distances between all point pairs and then selecting k nearest neighbors (KNNs) for each point in the data set. It often takes up to 90% of the computation time and has been known to be a bottleneck issue in clustering based machine learning.

The most significant issue associated with scalability in unsupervised learning under HDBSCAN is the so-called local join (LJ) operation, corresponding to approximately identifying k nearest neighbors via the nearest neighbors descent algorithm. The LJ operation is to bring together, for each point x in a data set, its KNNs and all points for which x is among their KNNs (reverse KNNs), compute all pairs of distances between the KNNs and reverse KNNs, and then, for each point x, group all such pairs involving x across the entire data set, and find the KNNs among this whole set. Because LJ operation is based on pair-wise distances, it is computationally expensive and hence becomes the bottleneck. In addition to the amount of data, the computation required in determining distances also depends on the dimensionality of feature vectors for data points. The higher the dimensionality, the more expensive the clustering is, and the more difficult to achieve scalability.

It is known that public domain versions of HDBSCAN do not scale beyond a million points or so. Although some effort has been devoted to address the scalability issue, so far there has been no effective solution that can significantly improve the scalability in the context of HDBSCAN. Thus, there is a need for a scalable state-of-the-art clustering solution in unsupervised learning to address the shortcomings and challenges of the traditional approaches.

SUMMARY

The teachings disclosed herein relate to methods, systems, and programming for information processing. More particularly, the present teaching relates to methods, systems, and programming related to raw text structuring.

In one example, a method, implemented on a machine having at least one processor, storage, and a communication platform capable of connecting to a network for identifying k nearest neighbors. A plurality of combined or grouped neighborhoods are received from a plurality of local join executors. Each combined/grouped neighborhood represents a neighborhood of a source data point and has one or more pairs of neighbors, each of which includes the source data point, a neighbor of the source point, and a distance in-between. A plurality of KNN lists corresponding to a plurality of source data points are obtained. Each KNN list includes K neighbors to a corresponding source data point, each of which is represented by an index of the neighbor and a distance between the source data point and the neighbor. The plurality of KNN lists are updated based on the plurality of combined/grouped neighborhoods to generate updated KNN lists.

In a different example, a system for identifying k nearest neighbors comprises a KNN list update controller and a KNN list updater. The KNN list update controller is configured for receiving a plurality of combined/grouped neighborhoods from a plurality of local join executors, wherein each of the combined/grouped neighborhoods represents a neighborhood of a source data point and has one or more pairs of neighbors, each of which includes the source data point, a neighbor of the source point, and a distance in-between. The KNN list updater is configured for obtaining a plurality of KNN lists corresponding to a plurality of source data points, wherein each of the plurality of KNN lists includes K neighbors to a corresponding source data point, each of the K neighbors is represented by an index of the neighbor and a distance between the source data point and the neighbor and updating the plurality of KNN lists based on the plurality of combined/grouped neighborhoods to generate updated KNN lists.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, a machine-readable, non-transitory and tangible medium having data recorded thereon that, once read, triggering the machine to perform the following steps for identifying k nearest neighbors. A plurality of combined/grouped neighborhoods are received from a plurality of local join executors. Each combined/grouped neighborhood represents a neighborhood of a source data point and has one or more pairs of neighbors, each of which includes the source data point, a neighbor of the source point, and a distance in-between. A plurality of KNN lists corresponding to a plurality of source data points are obtained. Each KNN list includes K neighbors to a corresponding source data point, each of which is represented by an index of the neighbor and a distance between the source data point and the neighbor. The plurality of KNN lists are updated based on the plurality of combined/grouped neighborhoods to generate updated KNN lists.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is an exemplary data structure of a dynamic KNN list associated with a data point, in accordance with an exemplary embodiment of the present teaching;

FIG. 6B is a flowchart of an exemplary process of a KNN server, in accordance with an exemplary embodiment of the present teaching;

FIG. 7 is an illustrative diagram of an exemplary mobile device architecture that may be used to realize a specialized system implementing the present teaching in accordance with various embodiments.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching aims to improve the scalability of unsupervised clustering by proposing a framework of computing k-nearest neighbors of data points in the training data. Particularly, the present teaching discloses a construct of distributed executors for local join operations in conjunction with a server (either centralized or distributed) for efficiently identifying, for each data point in the training data, k nearest neighbors. The distributed executors and server(s) enable parallel processing and communicate via indices to reduce time and bandwidth required to effectively speed up the KNN processing.

Figure 1A:
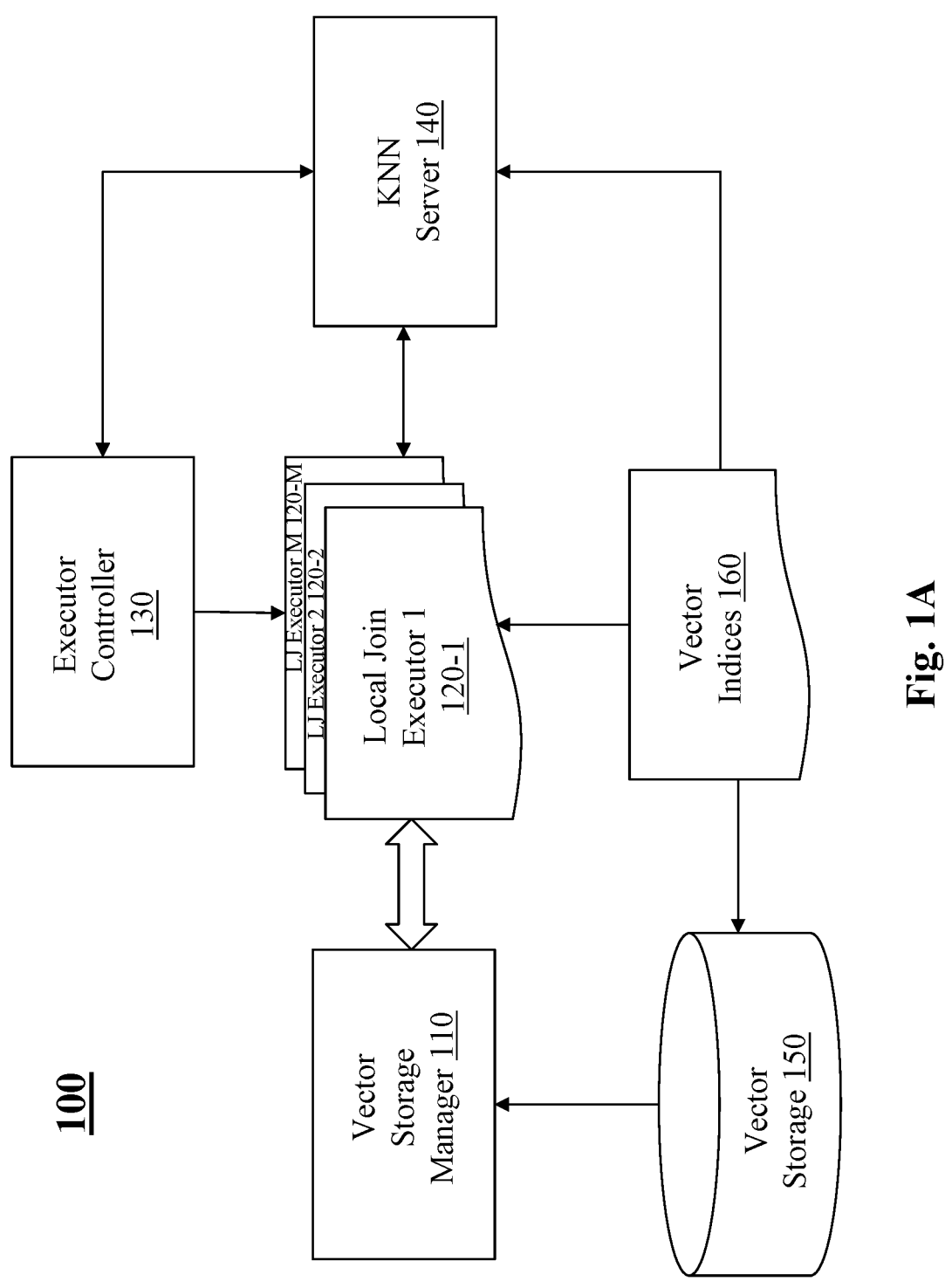
FIGS. 1A-1B depict exemplary frameworks for determining KNNs via distributed local join (LJ) operations, in accordance with exemplary embodiments of the present teaching.

FIG. 1A depicts an exemplary framework 100 for determining KNNs via distributed local join (LJ) operations, in accordance with an exemplary embodiment of the present teaching. The exemplary framework 100 comprises a vector storage manager 110, a plurality of local join executors 120-1, 120-2, . . . , 120-M, an executor controller 130, and a KNN server 140. The vector storage manager 110 manages a vector storage 150 where feature vectors of data points in the training data set are stored and can be retrieved upon request. The feature vectors stored in the vector storage 150 may be indexed via indices stored in a vector indices storage 160. The plurality of local join executors 120 may be responsible for performing local join operations. Each of the local join executors may be assigned a subset of data points in the training data set so that it can apply the local join operation to data points assigned thereto. That is, different local join executors may perform local join operations in parallel so that it enhances the speed of local join processing. Parallel operations of the plurality of local join executors may be coordinated or synchronized via the executor controller 130, including assignment of subsets of data points to different local join executors, initialization of certain operational parameters, and in some embodiments weight determination, as will be discussed herein below.

The local join operations may also be further improved by, as will be disclosed herein, carrying out most of local join operation steps based on indices of the data points assigned thereto and access feature vectors of assigned data points only when it is necessary. Such improvements can also enhance the speed or operational efficiency of the plurality of local join executors.

As disclosed herein, each local join executor performs local join operations for a subset of data points, distance computations are performed in parallel with other local join executors 120 and accordingly selects a certain number of nearest neighbors within its assigned subset of data points. Such local join results from different local join executors are then sent to the KNN server 140 so that the local join results from different executors may be integrated or merged to generate KNNs for each data point across all data points in the training data set. According to the present teaching, the integration operation performed by the KNN server 140 is based only on indices and known distances computed by the local join executors without needing to access feature vectors for such data points, further enhancing the efficiency of the operation of identifying KNNs for all data points. In the embodiment illustrated in framework 100, the integration of results from different local join executors is performed by a centralized KNN server 140.

Figure 1B:
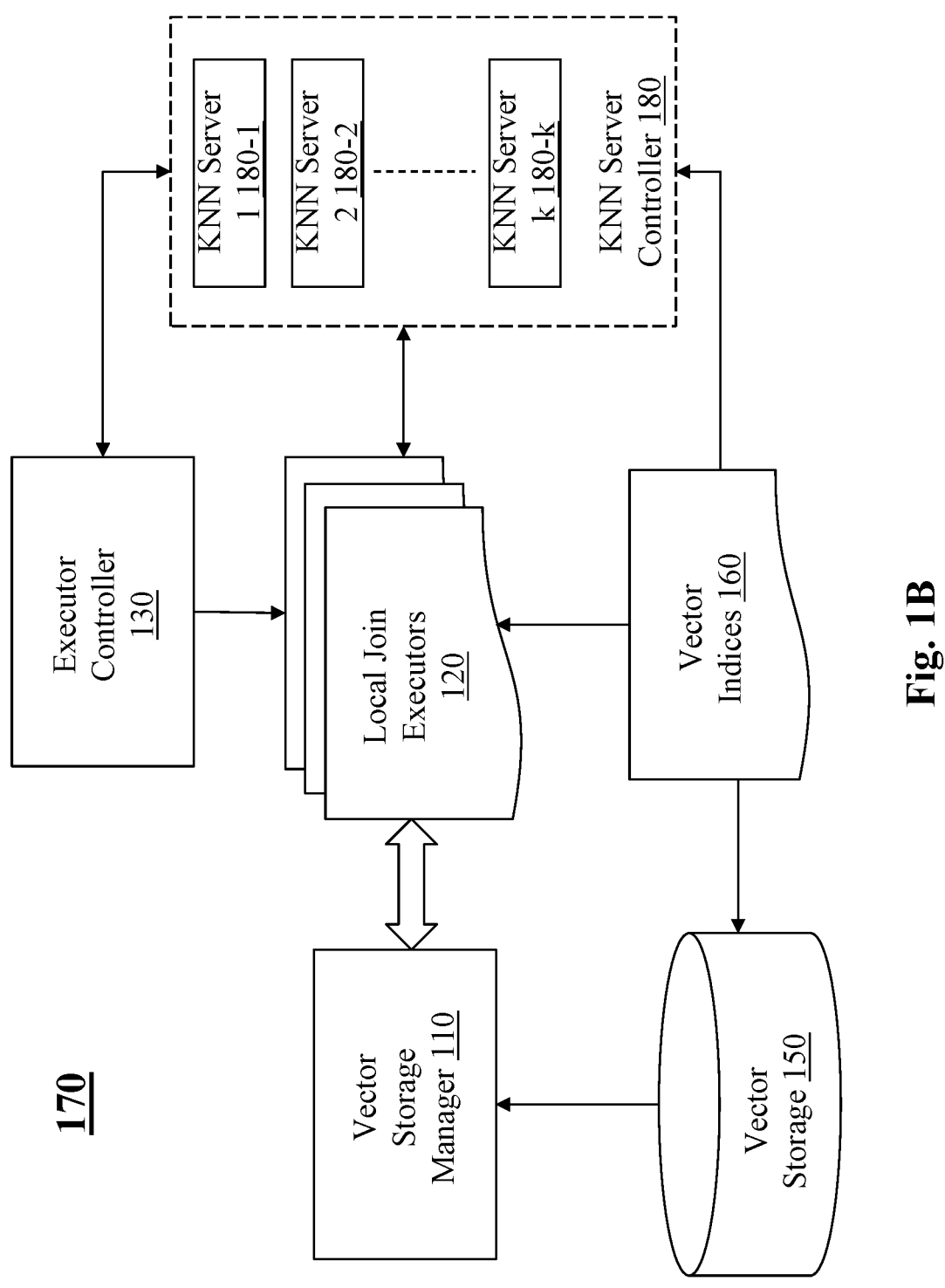

In other embodiments, the integration may also be performed by multiple distributed KNN servers that may accomplish the integration tasks in a parallel manner. This is illustrated in FIG. 1B, that depicts a different exemplary framework 170 for determining KNNs with a plurality of KNN servers, in accordance with a different exemplary embodiment of the present teaching. In framework 170, while other components remain the same as in FIG. 1A, there is a KNN server controller 180 that interfaces with the plurality of local join executors 120 and manages a plurality of KNN servers, including KNN server 1 180-1, KNN server 2 180-2, . . . , and KNN server k 180-k to complete the task of integrating local join results from all local join executors to come up with, for each data point, a KNN list based on distances from the data point to other data points in the training data set. There may be different ways to coordinate among different KNN servers to accomplish the integration in an efficient manner.

As can be seen, the present teaching is directed to a distributed version of a KNN based descent algorithm in clustering that leverages the vector storage 150, parallel-processing via the local join executors 120, and KNN server 140 (or 180) to deliver enhanced scalability in dataset size and vector dimension as compared with prior art. The KNN based computation based on the present teaching operates in iterations so that the quality/accuracy of the KNN lists associated with all data points improves with every iteration. The goal is to derive as accurate as possible KNN list for each data point via iterated operation. Prior to the first iteration, the KNN lists for all data points are randomly initialized and they are then iteratively updated until convergence based on some criteria. The randomly initialized KNN lists are stored in the KNN server 140 (or 180) as the initial state of the world. As discussed herein, the KNN server stores only the indices of data points that point to their actual vector representations stored in the vector storage 150.

Figure 2A:
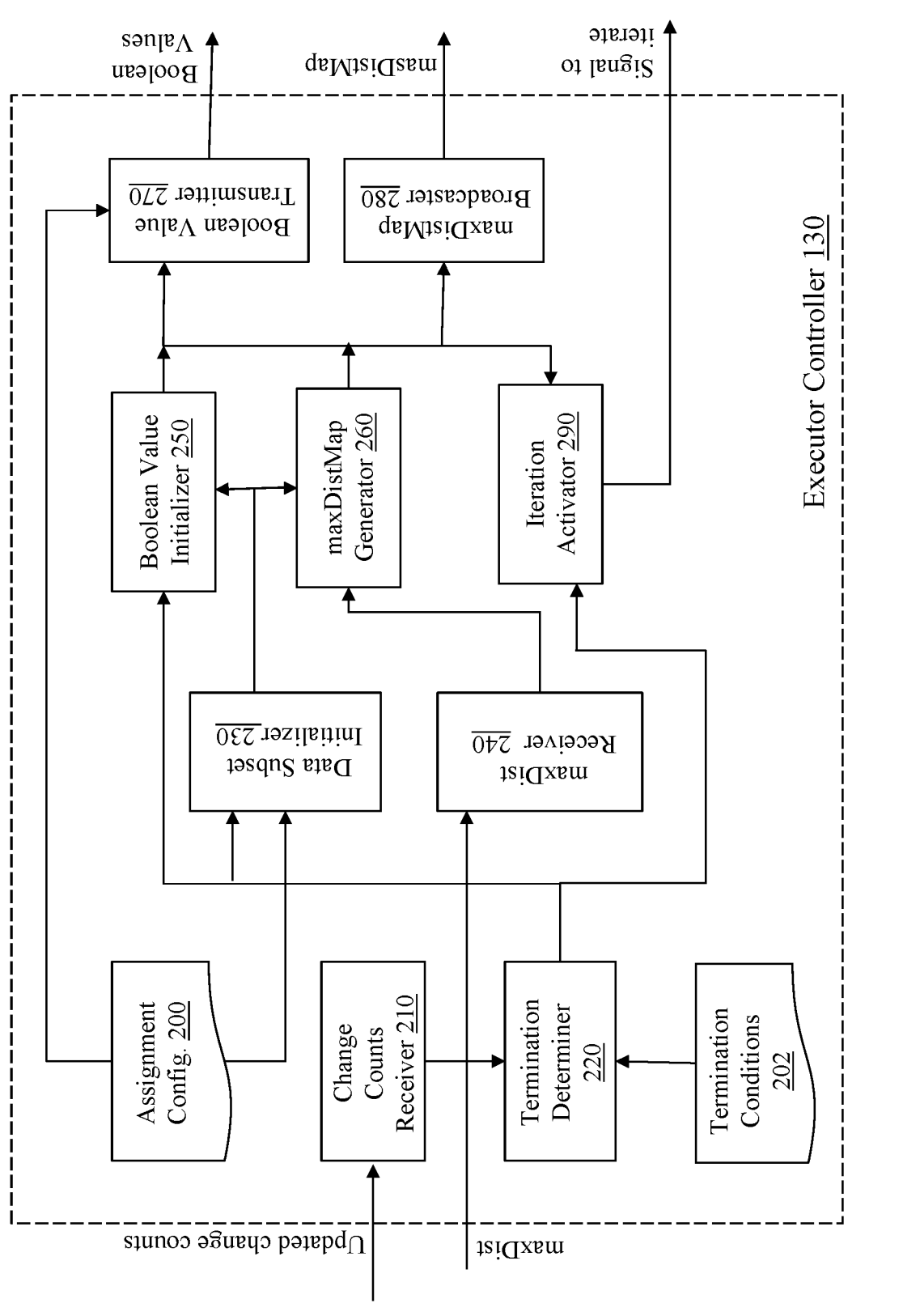
FIG. 2A depicts an exemplary high level system diagram for an executor controller, in accordance with an exemplary embodiment of the present teaching.

Details of how local join executors 120, the executor controller 130, and the KNN server 140 (or 180) individually operate, respectively, and coordinate via communication in accordance with the present teaching are provided below with respect to FIGS. 2A-6B. FIG. 2A depicts an exemplary high level system diagram for the executor controller 130, in accordance with an exemplary embodiment of the present teaching. As discussed herein, the executor controller 130 coordinates and controls the iterative descent process of identifying KNN lists for data points. In some embodiments, the KNN list initialization may be performed by the executor controller 130. In some embodiments, such initialization may be performed by the KNN server 140. Such initialization may include, e.g., assigning a different subset of data points to each of the local join executors, determining certain operational parameters for each iteration for some or all local join operations, and controlling the iteration based on operational status with regard to the local join executors. As discussed herein, some of such operations may be performed by the KNN server 140 in some embodiments.

To control iterations, at the beginning of every iteration, the executor controller 130 may compute an operational parameter called maxDist which is used by local join executors to select qualified neighbors. The maxDist value may vary with respect to each data point. That is, for all data points, a maxDistMap may be generated that maps each data point v to a value maxDist[v] according to the maxDistMap. maxDist[v] is used to ensure by a relevant local join executor that no data point x may be considered as a new neighbor of data point v if the distance between data points v and x exceeds maxDist[v]. In some embodiments, the value of maxDist[v] is determined to be the distance of data point v from the furthest data point in the KNN neighborhood computed up to that iteration. Prior to each iteration, maxDistMap computed with respect to all points, i.e., maxDist[v] for all v in the data set, may be broadcast to all local join executors 120 so that they may then be used as a filter to exclude points that are not qualified as a neighbor. That is, if the distance between a data point u and a data point v is more than maxDist[v], that data point u may be eliminated in that iteration and will not be sent to the KNN server 140 for updating the KNN list for point v.

In some embodiments, to facilitate the iterated processing, there may be some status indicator for each neighbor in a KNN list of a data point. For example, along with each of the neighbors, there may be an associated Boolean value, which may be set to "True" if the neighbor was just added to the neighborhood in the last iteration. If the neighbor existed in the list prior to the last iteration and it has been sampled before, the Boolean value for the neighbor may be set to "False." In different iterations, all old neighbors from the previous iteration may be provided to each local join executor and a random subset of the new data points that may be considered as new neighbors in this iteration may be allocated to the local join executor. Once a new neighbor is selected, it may then be marked as an old neighbor by setting the Boolean to false. As a special situation, for the initial iteration, all neighbors in a KNN list may be marked as "True" because they are all "new neighbors."

In the illustrated embodiment as shown in FIG. 2A, the executor controller 130 may include two parts, one is for generating operational parameters for the local join executors and the other for controlling the iterations associated with the local join executors. In the first part for generating operational parameters, the executor controller 130 includes a data subset initializer 230, a maxDist receiver 240, a Boolean value initializer 250, a maxDistMap generator 260, a Boolean value transmitter 270, and a maxDistMap broadcaster 280. In operation, the data subset initializer 230 may allocate a subset of data points from the training data set to each of the local join executors to handle. In some embodiments, the allocation may be based on some assignment configuration stored in 200. For instance, each executor may be allocated with an equal number of data points for load balancing. In some embodiments, the allocation may be carried out dynamically based on some criteria. For instance, depending on operational parameters associated with local join executors, e.g., the capacity or current workload, different local join executors may be assigned to a subset of data points of different size.

With new data points assigned to each of the local join executors, the Boolean value initializer 250 determines, in each iteration, Boolean value for each of the data points in the list in accordance with the scheme discussed herein. Such Boolean values associated with data points to be considered in selecting new neighbors are sent, via the Boolean value transmitter 270 to the local join executors together with the data points. The maxDist receiver 240 is for receiving, in each iteration, a maxDist value of a KNN list for a data point. Based on the maxDist values of all KNN lists associated with all data points, a maxDistMap can be generated. That is, maxDist values are received from all executors for KNN lists of all data points and a MaxDistMap is generated for all data points and broadcast to all local join executors. In some embodiments, a maxDistMap may be generated for data points handled by each local join executor so that it may be transmitted to the local join executor. That is, for different local join executors, different maxDistMaps are generated and dispatched to corresponding local join executors.

On the operation of controlling the iterative process, the executor controller 130 controls when to stop the iteration based on, e.g., the counts of changes of neighbors in each iteration. That is, if the changes of neighbors in one iteration remain high, the iteration may continue because it has not yet converged. If the count of changes of neighbor is lower than some criterion, the iteration may terminate. To control iteration, the executor controller 130 includes a change counts receiver 210, a termination determiner 220, and an iteration activator 290. In operation, when the change counts receiver 210 receives the counts of changes for KNN lists, it invokes the termination determiner 220 to assess, based on some termination conditions stored in termination configuration 202, whether the iterative operation has converged.

If the process has not yet converged, the termination determiner 220 sends a signal to the iteration activator 290 to instruct it to signal the local join executors to enter into the next iteration. In some embodiments, when it is determined that another round of iteration is to occur, operational parameters for the next round of iteration may also be generated. In this case, the termination determiner 220 may invoke the data subset initializer 230 for assigning data points to the executors. To prepare for the next iteration, the maxDist receiver 240 may receive maxDist values from executors, which are then used by the maxDistMap generator 260 to generate and subsequently broadcast the maxDistMap to all executors. Similarly, for the newly assigned points to each executor, the Boolean value initializer 250 may update the Boolean values for each of the neighbors for the next iteration.

If the termination determiner 220 determines that the iteration process has converged, the executor controller 130 does not trigger the executors to continue the iterative process so that the KNN lists derived at that point will be the converged KNN lists for data points. In some embodiments, some of the operations performed by the executor controller 130, as described above, may be performed by the KNN server 140. For instance, the determination of Boolean values and maxDist values for each iteration may be performed by the KNN server 140 based on the current version of the KNN lists for the data points. Such an implementation choice may be made based on different considerations, including processing bottleneck, application needs, etc.

Figure 2B:
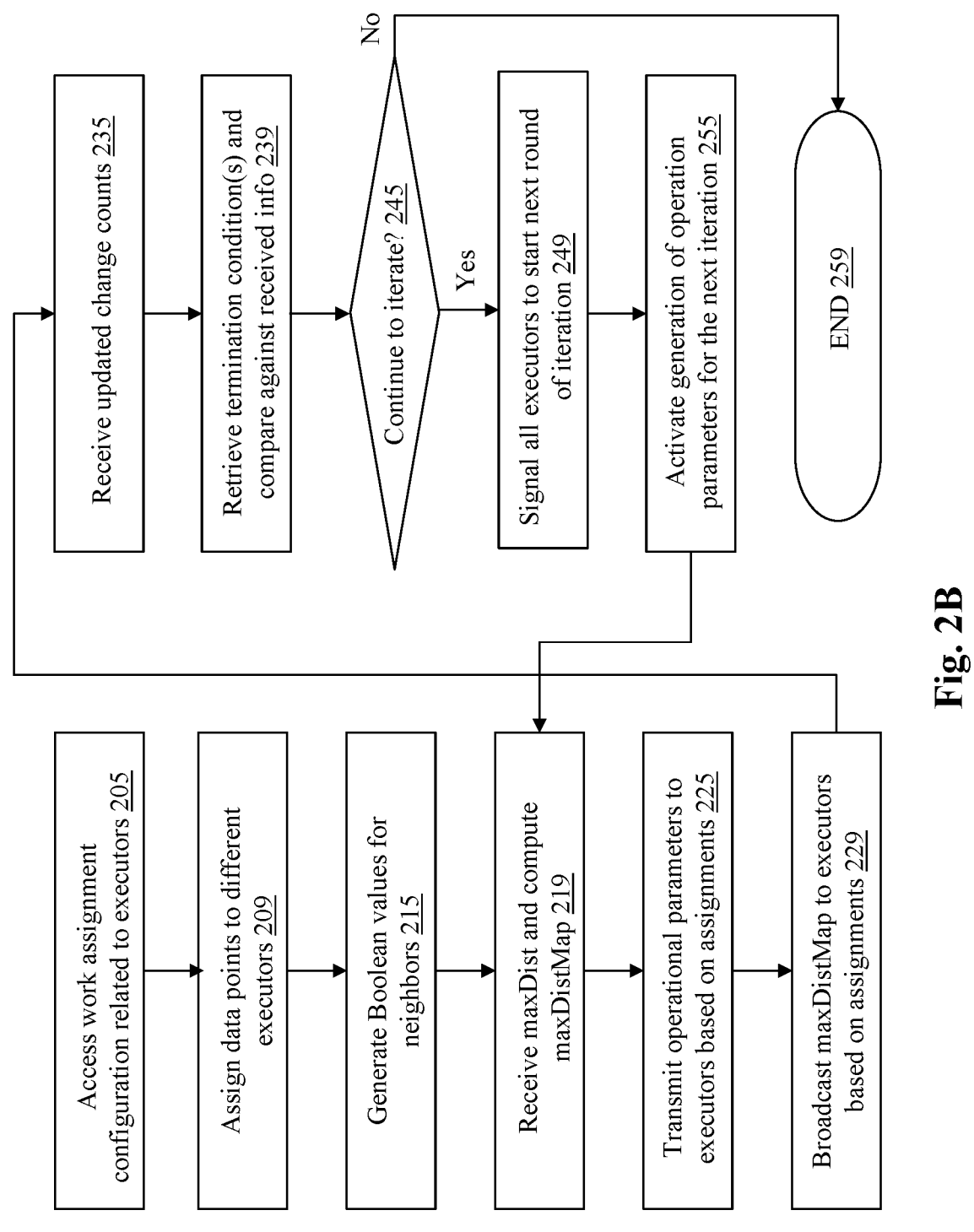
FIG. 2B is a flowchart of an exemplary process of an executor controller, in accordance with an exemplary embodiment of the present teaching.

FIG. 2B is a flowchart of an exemplary process of the executor controller 130, in accordance with an exemplary embodiment of the present teaching. In FIG. 2B, the operation starts from assigning subsets of data points to different local join executors and optionally generating initial KNN lists based on the assignments. To do so, data subset initializer 230 accesses, at 205, work assignment configuration stored in 200 and allocates, at 209, subsets of data points based on the assignment configuration to different local join executors. In generating the initial KNN lists, the Boolean value initializer 250 generates, at 215, Boolean values for initial neighbors in the initial KNN lists. The maxDist receiver 240 obtains, at 219, maxDist values for each KNN list associated with each source data point for filtering qualified neighbors. Based on the maxDist values, the maxDistMap generator 260 generates a maxDistMap for all KNN lists for source data points, where a source point is defined to be a data point for which K nearest neighbors are to be identified. The KNN lists generated based on assignment of data points and corresponding Boolean values for initial neighbors therein are transmitted, at 225 by the Boolean value transmitter 270, to relevant local join executors. Similarly, the maxDistMap(s) are also broadcast, at 229 by the maxDistMap transmitter 280, to all local join executors.

As discussed herein, the executor controller 130 controls the iterations based on the change counts to KNN lists. When the change counts receiver 210 receives, at 235, updated change counts, it invokes the termination determiner 220 to assess whether the iteration process has converged. To achieve that, the termination determiner 220 retrieves, at 239, termination conditions or criteria from 205 and assesses whether the termination conditions are met based on the received change counts. If the change count information satisfies the termination conditions, determined at 245, the executor controller 130 terminates the iteration process at 259. If the change count information does not satisfy the termination conditions, the iteration process continues. In this case, the termination determiner 220 invokes the iteration activator 290 to signal, at 249, local join executors to proceed to the next iteration cycle. In some embodiments, as illustrated in FIG. 2B, the termination determiner 220 also invokes the maxDist receiver 240 to obtain maximum distance or maxDist values for KNN lists from the local join executors. The received maxDist values are then sent to the maxDistMap generator 260 to compute a maxDistMap for the next iteration based on the maxDist values from executors. The maxDistMap for the next iteration is then broadcast, at 229 by the maxDistMap transmitter 280 to all executors. As discussed herein, in some embodiments, the computations of such operational parameters may also be generated or provided by the KNN server 140 to local join executors (not shown).

According to the present teaching, the executor controller 130 controls the iteration process of local join executors 120. Each of the local join executors 120 takes a subset of data points as input and operates to identify k-nearest neighbors for each of the data points within the subset of data points assigned thereto. As each of the local join executors operates in a sub range of points in the dataset, a local candidate neighbor of a source point v identified by a local join executor may not qualify as a globally suitable KNN neighbor of data point v. The determination of globally qualified KNN neighbors of data point v is made by the KNN server 140 when it receives local join results generated in parallel by local join executors. In some embodiments, the local join result from a local join executor is a list of pairs of data points. Each pair of data points represents a neighboring relationship with some associated information indicating how closely the relationship is, which may be a distance measure representing a distance between the two data points in the pair. For example, a neighbor relationship may be represented by a tuple, e.g., (v, a, d), with a pair of data points v and its neighbor a, and a distance value d.

A local join result from a local join executor may include a plurality of tuples for each source data point v. That is, a source data point v can have a plurality of neighbors, represented by a plurality of tuples where the neighbors are identified from the subset of data points that the local join executor handles. At each iteration, local join executors send their respective local join results to the KNN server 140 to update the integrated KNN result.

According to an embodiment of the present teaching, to dynamically update KNN lists for source data points in an iterative process, the KNN server 140 maintains a global KNN list for each source data point and such global KNN lists are updated in each iteration based on local join results from local join executors during the iteration. FIG. 3 shows an exemplary data construct of a KNN list for a data point v, in accordance with an exemplary embodiment of the present teaching. In this example KNN list for a data point, say v, it includes a list of K neighbors, where each of the neighbors is represented by several attributes: (1) an index pointing to the neighboring point, (2) a distance between data point v and the neighbor, and (3) a Boolean value or BV for the neighbor.

In each iteration, when the KNN server 140 receives local join results from local join executors, it decides whether each KNN list for each data point v needs to be updated by identifying whether any of the neighbors in the KNN list can be replaced with a new neighbor from any of the executors. For example, if a local join result includes a new neighbor of data point v that is closer to point v than any of the existing neighbors in the KNN list, then an existing neighbor that has a larger distance to point v than that of the new neighbor, then the existing neighbor may be replaced or removed and the new neighbor may now be included in the KNN list as one of the KNN neighbors. If there are more than one existing neighbors that have a larger distance to point v than that of the new neighbor, the existing neighbor that has the largest distance may be removed.

In this manner, the KNN server 140 always maintains the global KNN lists for all data points based on local join results from executors that identified the closest neighbors identified up to that iteration based on their own subsets of data. Certain information in such a dynamically updated KNN list may be used to control the iteration of the local join executors. As discussed herein, the largest distance among all existing neighbors in an KNN list may be used as maxDist serving as a threshold to filter out candidate neighbors to be identified in the next round of iteration. That is, when a local join executor evaluates new candidate neighbors for a data point v, any new candidate neighbor that has a distance to point v larger than the largest distance value in the KNN list for point v will not be a qualified neighbor and thus, should not be selected as a candidate neighbor of v. Upon the KNN lists being updated, the KNN server 140 may communicate such updated KNN lists to local join executors 120 or send only the maxDist values. Upon receiving the KNN lists or maxDist values at different executors, which may then determine maxDist values and send to the executor controller 130. Upon receiving the maxDist values from executors, the executor controller 130 may then compute the maxDistMap and broadcast to all executors to serve as filters in the next iteration in selecting new neighbors.

Figure 4A:
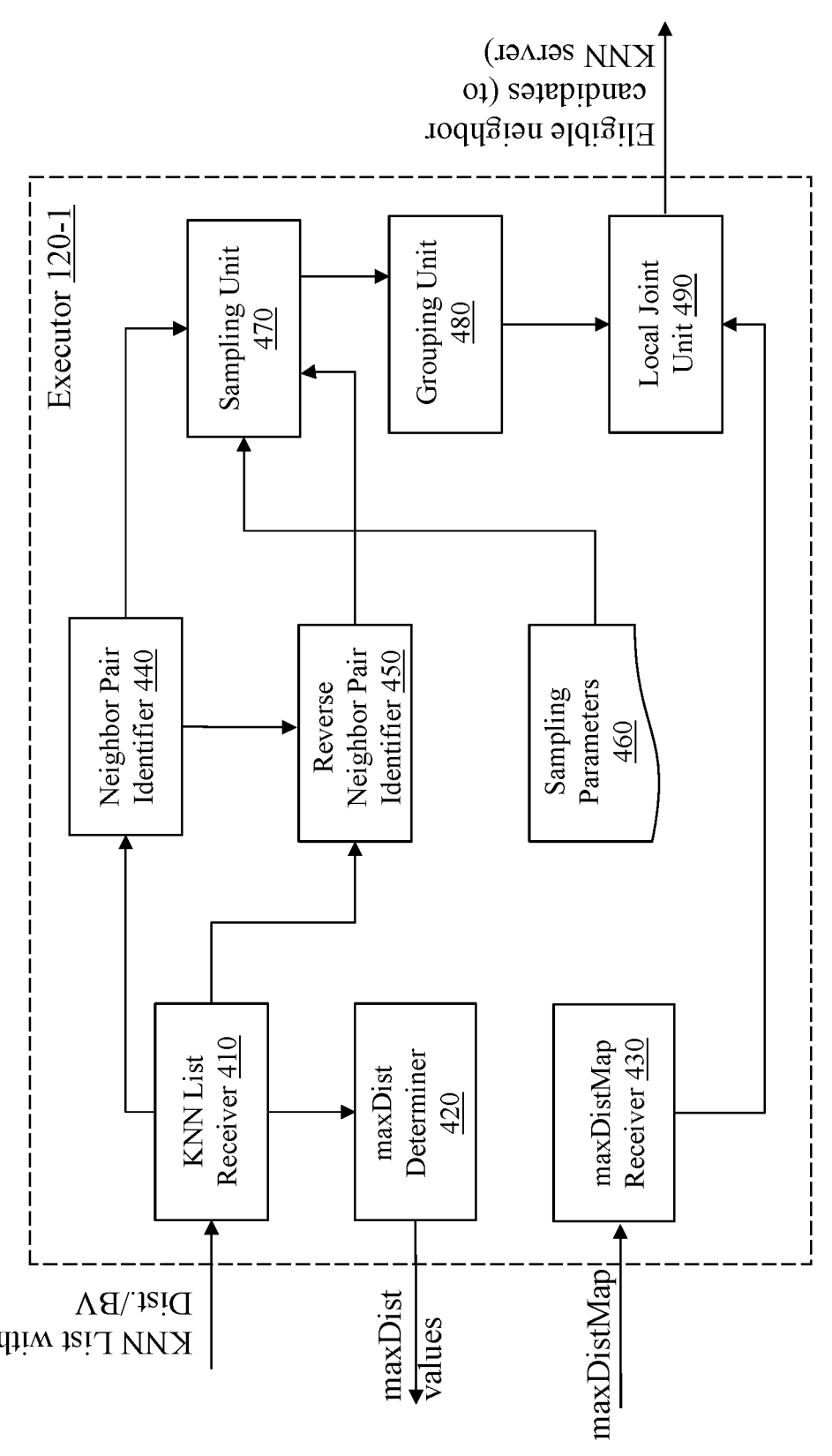
FIG. 4A depicts an exemplary high level system diagram for an executor, in accordance with an exemplary embodiment of the present teaching.

FIG. 4A depicts an exemplary high level system diagram for a local join executor, in accordance with an exemplary embodiment of the present teaching. The local join executor, say 120-1, comprises a KNN list receiver 410, a maxDist determiner 420, a maxDistMap receiver 430, a neighbor pair identifier 440, a reverse neighbor pair identifier 450, a sampling unit 470, a grouping unit 480, and a local join unit 490. As discussed herein, each local join executor is provided with a subset of data points to identify candidate neighbors for each data point within the given subset of data within some confines. The local join executor operates in an iterative manner and the iteration process is controlled by the executor controller 130. In operation, when the KNN list receiver 410 receives the KNN lists assigned to it to handle. As discussed herein, each KNN list is directed to a data point and includes indices to current neighbors identified so far, a distance from each of the neighbors to the data point, and in some embodiments, a Boolean value for the neighbor. As discussed herein, as most of the operations performed based on the KNN lists are based on indices, it enhances the processing speed and, hence, the scalability.

Based on the KNN lists received, the maxDist determiner 420 computes maxDist values for each of the KNN lists received and sends to the executor controller 130 so that a maxDistMap can be generated that may integrate all maxDist values from executors to provide a global maxDist Map. When the maxDistMap is received by the maxDistMap receiver 430, it is sent to the local join unit 380 as criteria to control how to filter qualified candidate neighbors.

According to the present teaching, to identify candidate neighbors for each data point, a local join executor operates to identify a set of neighbors and a set of reverse neighbors. A neighbor of a data point, say v, is defined as another point in a feature space that is within a certain distance to point v or, initially is selected in a random manner. As discussed herein, a neighbor of a point v can be represented as a pair of points. A set of neighbors of point v corresponds to a set of pairs of points. For example, if points a, b, c, . . . , k are neighbors of point v, points a, b, c, . . . , k form a neighborhood of point v. Such neighboring relationships may be represented by a corresponding set of point pairs, e.g., (v, a), (v, b), (v, c), . . . , (v, k), where in each pair v is the source point. The neighbor pair identifier 440 may be configured to extract such neighbor pairs from the KNN lists received.

Each pair of points corresponds to a direct edge pointing from point v to its neighbor, a reverse neighbor can be identified by reversing the direction of the edge. For instance, if point v has neighbor a or (v, a), then point v is a reverse neighbor of point a. For all pairs of neighboring points with an edge pointing from a source point to a neighbor point, reverse neighbors can be created by reversing such edges where the original neighbor points are used as the source point and the source is now listed as a neighbor points. The reverse neighbor pairs are identified by the reverse neighbor pair identifier 450. The operations of identifying neighbor pairs and reverse neighbor pairs are performed by the local join executors in parallel.

In some embodiments, such identified neighbor pairs and reverse neighborhoods may be sampled. This is performed by the sampling unit 470 based on, e.g., sampling parameters stored in 460. Such sampling parameters may be determined based on different application needs. For example, a sampling criterion may be to retain only a certain percentage of the neighbor/reverse neighbor pairs. This may reduce the amount of processing and introduce a certain degree of randomness. As the entire process is iterative, sampling down in each iteration may not impact the outcome of the computation. Although it is disclosed herein that sampling is performed after neighbor pairs and reverse neighbor pairs are identified, it does not serve as a limitation but merely an illustration. For example, in some alternative embodiment, such sampling may not be performed. In other alternative embodiments, such sampling may also be performed prior to neighbor/reverse neighbor pairs being identified. Whether sampling or not may be determined based on different criteria or application needs. In some embodiments, sampling that is performed prior to neighbor/reverse neighbor pairs being identified may be performed in the topk servers.

The neighbor pairs and the reverse neighbor pairs of all data points handled by each local join executor form long lists of neighbors. To form proper neighborhood data structures from these long lists of edges, a group operation is performed by the grouping unit 480 that groups pairs or edges by source points to form a combined/grouped neighborhood for each source point. The grouping unit may communicate with other local join executors to exchange groups corresponding to source nodes that the respective executors have been configured to handle, merging partial groups that it receives from other executors' grouping units. Such combined/grouped neighborhoods for source points are then sent to the local join unit 490 for further processing to generate eligible neighbor candidates that are to be sent to the KNN server 140 to update the KNN lists. Details on how the local join unit operates are provided with respect to FIGS. 5A and 5B.

Figure 4B:
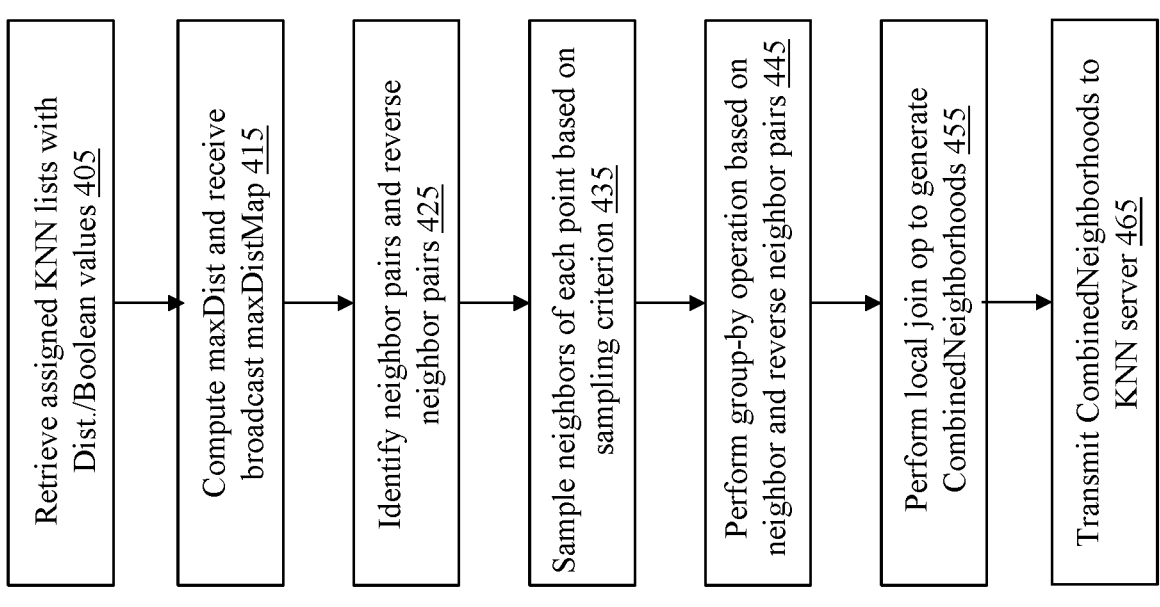
FIG. 4B is a flowchart of an exemplary process of an executor, in accordance with an exemplary embodiment of the present teaching.

FIG. 4B is a flowchart of an exemplary process of a local join executor, in accordance with an exemplary embodiment of the present teaching. The flow of processing steps as illustrated in FIG. 4B are consistent with what is described above. Specifically, when the assigned KNN lists are received at 405, maxDist values for the received KNN lists are computed and sent to the executor controller 130, where maxDist values from all executors are integrated to generate the maxDistMap before broadcasting to all executors. When the local join executor 120-1 receives the maxDistMap at 415, it is sent to the local join unit 490 for filtering qualified candidate neighbors. To generate candidate neighbors, neighbor pairs and reverse neighbor pairs are identified at 425 and sampling may be optionally applied at 435. Such expanded neighbor pairs are grouped, at 445, based on source points to generate grouped neighbor pairs, which are then used by the local join unit 490 to generate, at 455, grouped neighborhoods for each of the source data points. The grouped neighborhoods are then sent, at 465, to the KNN server 140 for updating the KNN lists for all data points.

Figure 5A:
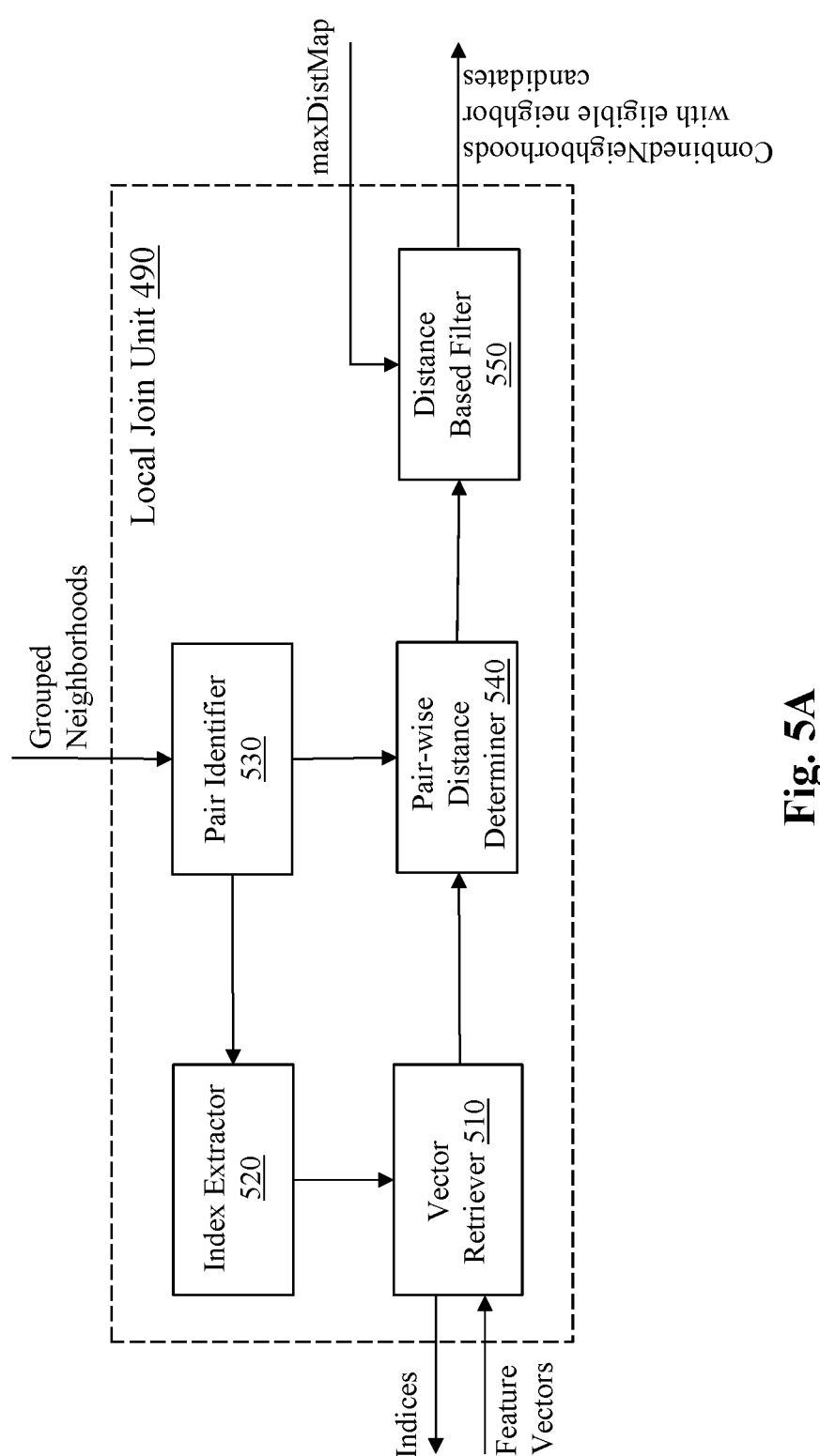
FIG. 5A depicts an exemplary high level system diagram for a local join unit, in accordance with an exemplary embodiment of the present teaching.

FIG. 5A depicts an exemplary high level system diagram for the local join unit 490, in accordance with an exemplary embodiment of the present teaching. As discussed herein, the input to the local join unit 490 is neighborhoods derived by grouping neighbor pairs and reverse neighbor pairs with respect to each of source data points. Local join unit 490 is provided for selecting candidate neighbors from the grouped neighborhoods based on actual distances computed between each pair of points. All processing steps discussed so far use only indices of data points without accessing feature vectors and thus saving time and enhance scalability. As the function of the local join unit 490 is to select qualified candidate neighbors, it is the only module that retrieves feature vectors of points, including source points and their neighbors, in order to identify closest qualified neighbors for different source points.

Figure 5B:
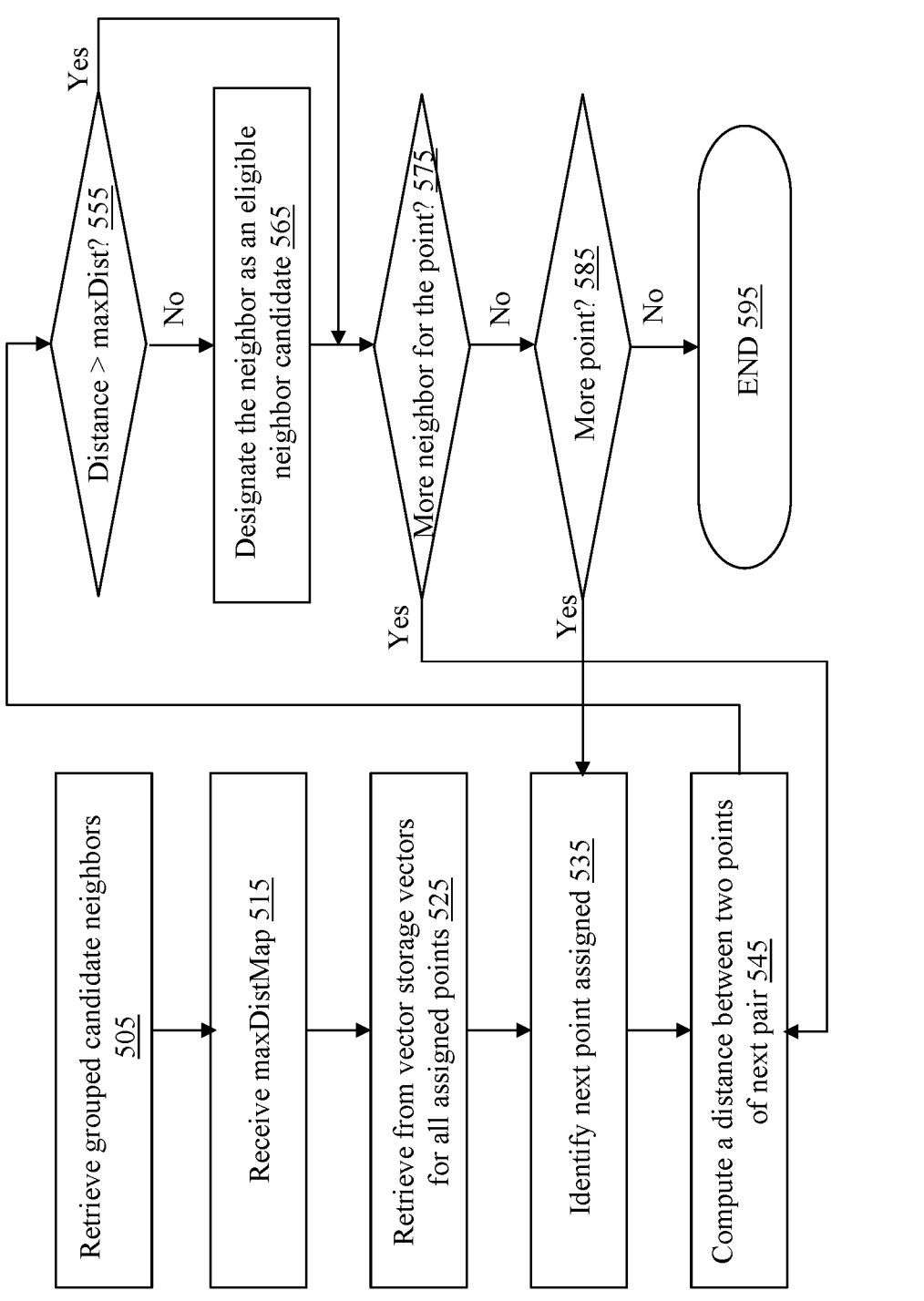
FIG. 5B is a flowchart of an exemplary process of a local join unit, in accordance with an exemplary embodiment of the present teaching.

In the illustrated embodiment, the local join unit 490 comprises a pair identifier 530, an index extractor 520, a vector retriever 510, an index extractor 520, a vector retriever 510, a pair-wise distance determiner 540, and a distance based filter 550. These components operate in a coordinated manner to select, from sampled candidate neighbors for each of the source data points, qualified candidate neighbors and send them to the KNN server 140 to update the KNN lists. FIG. 5B is a flowchart of an exemplary process of the local join unit 490, in accordance with an exemplary embodiment of the present teaching. In operation, the pair identifier 530 receives, at 505, candidate neighbors grouped with respect to different source data points (from the grouping unit 480). The distance based filter 550 receives, at 515, the maxDistMap broadcast from, e.g., the executor controller 130 or the maxDistMap receiver 430. Based on the received candidate neighbor pairs for source data points, the pair identifier 530 identifies the neighboring pairs and sends them to the index extractor 520 to extract the indices of the points in the pairs. Such indices are to be used by the vector retriever 510 to send requests to the vector storage 150 to retrieve, at 525, feature vectors for the data points based on the indices.

Such retrieved feature vectors for data points are then sent to the pairwise distance determiner 540 to compute the distances for the pairs of neighbors. Specifically, each pair of points is identified at 535 and a distance between the pair of points is computed, at 545, based on the feature vectors of the points retrieved from the vector storage 150 and sent to the distance based filter 550 to determine whether one of the point in the pair qualifies as a neighbor of the source point in the pair. As discussed herein, according to the present teaching, maxDistMap may be used as a filtering criterion for that purpose. The maxDistMap includes maxDist values for all data points, i.e., maxDist[v] for all v in the dataset with data point v being a source point. That is, for a point x to qualify as a neighbor of data point v, the distance between x and v may be required not to exceed maxDist[v].

With a distance computed for a pair that has at least one of the Boolean flags is set true, say (v, x) of points, the distance based filter 550 determines, at 555, whether the distance between v and x exceeds maxDist[v]. If so, point x does not qualify as a neighbor of point v. That is, point x is filtered out as a potential neighbor of v and the processing moves to step 575. If the distance for (v, x) does not exceed maxDist[v], point x satisfies the criterion of a qualified candidate neighbor. In this case, point x is designated as an eligible neighbor to be sent to the KNN server 140. Similar considerations are applied to (x, v), with x as the source. After the processing of the current pair (either discard point x or designating it as an eligible candidate neighbor), the processing continues to step 575, where it is determined whether the same source point v have more candidate neighbors to be assessed, i.e., whether there are more pairs of points involving point v as a source point. If so, the pairwise distance determiner 540 computes, at 545, the distance between v and the next candidate neighbor, say point y, included in the next pair and then maxDist[v] is used to determine whether pointy is an eligible neighbor at steps 555-565. The process repeats for all the candidate neighbors of point v until all the candidate neighbors for source point v have been evaluated and filtered. At that point, it is determined, at 585, whether there are more source data point, say w, for which eligible neighbors thereof are to be selected. If no source point remains, the process ends at 595. Otherwise, the process goes back to step 535 to start to identify each and every pair with point w as the source point and filter all candidate neighbors of point w using maxDist [w]. The local join unit 490 continues the processing as disclosed herein until all candidate neighbors of all source points are filtered using maxDistMap. What results are the grouped neighborhoods, which will be sent to the KNN server 140 as the basis to update the KNN lists.

The operations described herein for a local join executor are similarly performed in parallel by all local join executors, each of which may be handling a subset of the data points in the dataset. In each iteration, local join executors send their respective resultant combined/grouped neighborhoods for the data they handle to the KNN server 140, which can then integrate such results from executors to update the KNN lists for all source data points. That is, if there is any newly identified eligible neighbor from any of the executors for a source point that is better than an existing neighbor identified previously, an existing neighbor at the maximum distance from the source point is replaced with the newly identified eligible neighbor. This is considered as a change to the KNN list. Through such updates, the KNN server 140 produces the updated best K neighbors for all source points. While updating the KNN lists, the KNN server 140 may also generate other types of information for facilitating next iteration and control thereof. For example, such information may include the Boolean values associated with each neighbor in the updated KNN lists, updated maxDist for each KNN list for a source point, and/or a count of a number of changes made to each of the KNN lists during an iteration.

With regard to setting Boolean value for each neighbor in a KNN list during a particular iteration, the KNN server 140 may, for example, set a "True" for each new neighbor added to the KNN list and a "False" to all other previously existing neighbors that have participated in local join operations (e.g., have been sampled in embodiments where random sampling is in effect). As to maxDist, an embodiment is disclosed with reference to FIG. 4A that each executor may, upon receiving the updated KNN lists assigned thereto, determine updated maxDist values based on the received KNN lists. In an alternative embodiment, the KNN server 140 may generate updated maxDist values for the updated KNN lists while updating them and then send the updated maxDist values with the updated KNN lists to appropriate local join executors or the executor controller.

With regard to change count related to each KNN list, as discussed herein, the total change count to the KNN lists in a particular iteration may be used to determine whether the process of identifying KNNs for all source points has converged. To facilitate the iteration control, the KNN server 140 may, while updating the KNN lists, keep track of the number of changes made to each of the KNN lists and generate a total change count for a current iteration with respect to each KNN list. Such change counts for different KNN lists may also be accumulated to generate a total change count to all KNN lists, which may be used by the executor controller 130 to determine whether the iteration is to continue.

There may be different ways for the KNN server 140 to communicate the change count(s) to other components. In some embodiments, the KNN server 140 may send both the change counts and their respective updated KNN lists to the local join executors. In some embodiments, local join executors may respectively read the updated KNN lists in their assignments with related change counts from the KNN server 140. In either of these cases, each local join executor may, upon obtaining the updated KNN lists, forward the associated change counts to the executor controller 130, where the received change counts from the executors are summed up to generate a total change count as the basis for a determination as to whether the process has converged.

In different embodiments, the KNN server 140 may send information related to the change counts directly to the executor controller 130. In some situations, the KNN server 140 may send the individual change counts associated with the KNN lists to the executor controller 130 so that a total change count may be derived by the executor controller 130. In some embodiments, the KNN server 140 may also compute a total change count across all KNN lists (e.g., based on the accumulated change counts of individual KNN lists) and communicate that to the executor controller 130. A choice over such multiple implementation possibilities may be made based on different considerations, including configuration of different system components, network connection configurations, or specific performance criteria of different application. These alternative configurations do not serve as limitations but rather illustrations of the present teaching. Additional arrangements are also possible and are also within the scope of the present teaching.

Figure 6A:
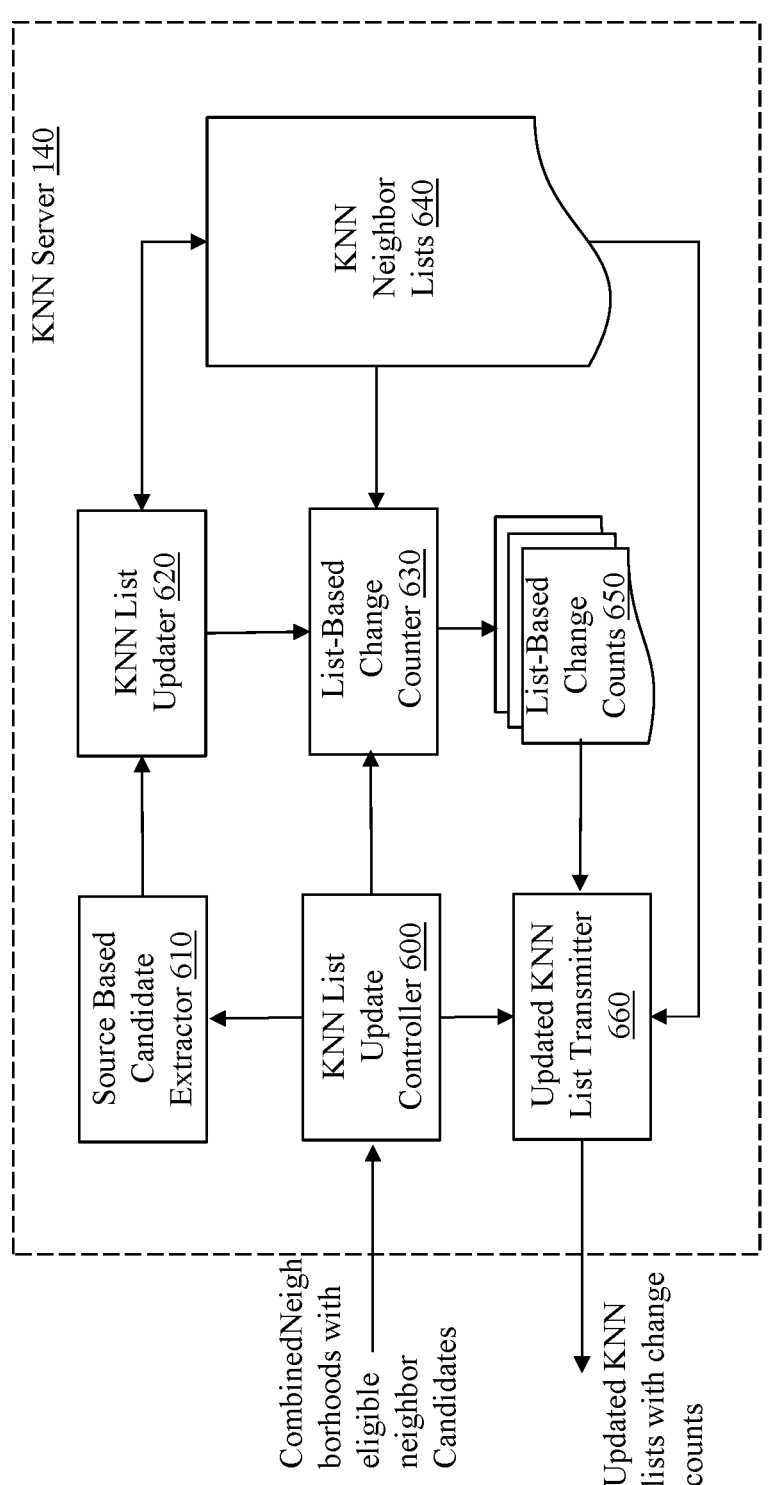
FIG. 6A depicts an exemplary high level system diagram for a KNN server, in accordance with an exemplary embodiment of the present teaching.

In addition, as discussed herein, in some embodiments, there is one KNN server 140 as depicted in FIG. 1A for maintaining and updating all KNN lists. In other embodiments, there may be distributed KNN servers 180 as depicted in FIG. 1B with each of the KNN servers maintaining and updating some of the KNN lists simultaneously. In either configuration, a KNN server (whether centralized or distributed) is provided for updating some KNN lists in each iteration and communicating the results to appropriate local join executors 120 and/or executor controller 130. FIG. 6A depicts an exemplary high level system diagram for the KNN server 140, in accordance with an exemplary embodiment of the present teaching. A distributed KNN server in the configuration shown in FIG. 1B is generally configured and functions in a similar manner.

As discussed herein, there are different possible configurations that determine how the KNN server 140 is structured, operates, and communicates with other components. In the illustrated embodiment depicted in FIG. 6A, the KNN server 140 is configured to update KNN lists and then send updated KNN lists to local join executors with change counts associated with the updated KNN lists and maxDist values for the updated KNN lists are computed by individual local join executors upon receiving the updated KNN lists. With this configuration, the KNN server 140 comprises a KNN list update controller 600, a source based candidate extractor 610, a KNN list updater 620, a list-based change counter 630, and an updated KNN list transmitter 660.

FIG. 6B is a flowchart of an exemplary process of the KNN server 140 in the configuration as shown in FIG. 6A, in accordance with an exemplary embodiment of the present teaching. In operation, when the KNN list update controller 600 receives, at 605, eligible candidate neighbors from local join executors, it invokes the source based candidate extractor 610 to start the update of the KNN lists and the list-based change counter 630 to keep track of change count with respect to each of the KNN lists that is being updated. In this illustrated embodiment, as there is one KNN server 140, the update to KNN lists may be performed one or multiple at a time. When there are distributed KNN servers as shown in FIG. 1B, the KNN lists may be updated in parallel.

To update the KNN lists in series, the source based candidate extractor 610 identifies, at 615, a next source data point and the combined or grouped neighborhoods from a local join unit. The source data point and its combined/grouped neighborhoods are sent to the KNN list updater 620, which accesses, at 625, the current KNN list for the source data point from the KNN neighborhood lists 640. The existing neighbors in the retrieved current KNN list are compared with the eligible candidate neighbors based on their distances to the source point. As discussed herein, if the distance from an existing neighbor to the source point is larger than the distance from an eligible neighbor to the source point, an existing neighbor at the largest distance from the source point is replaced using the eligible neighbor. In this manner, the KNN list updater 620 generates, at 635, an updated KNN list for the source point and stores the updated KNN list back to the KNN neighbor lists 640. While updating an KNN list, whenever a change is made, the KNN list updater 620 may communicate with the list-based change counter 630 to update the number of changes occurred to generate the updated KNN list. The list-based change counter 630 records, at 645, the change count associated with the updated KNN list so that it can be provided, together with the updated KNN list to the local join executor that is assigned with the source point.

Once one KNN list is updated, the source based candidate extractor 610 determines, at 655, whether there are more source points for which KNN list update needs to be performed. If there are, the process continues to step 615 to update the KNN list for the next source point. When the KNN lists are updated, the updated KNN list transmitter 660 transmits, at 665, the updated KNN lists, together with the change counts associated therewith, to corresponding local join executors. In some embodiments, the transmission of updated KNN lists and associated change counts may also be transmitted after they are generated, instead of waiting until all KNN lists have been updated. In some embodiments, the transmission may also be performed upon a request from the local join executors.

Figure 7:
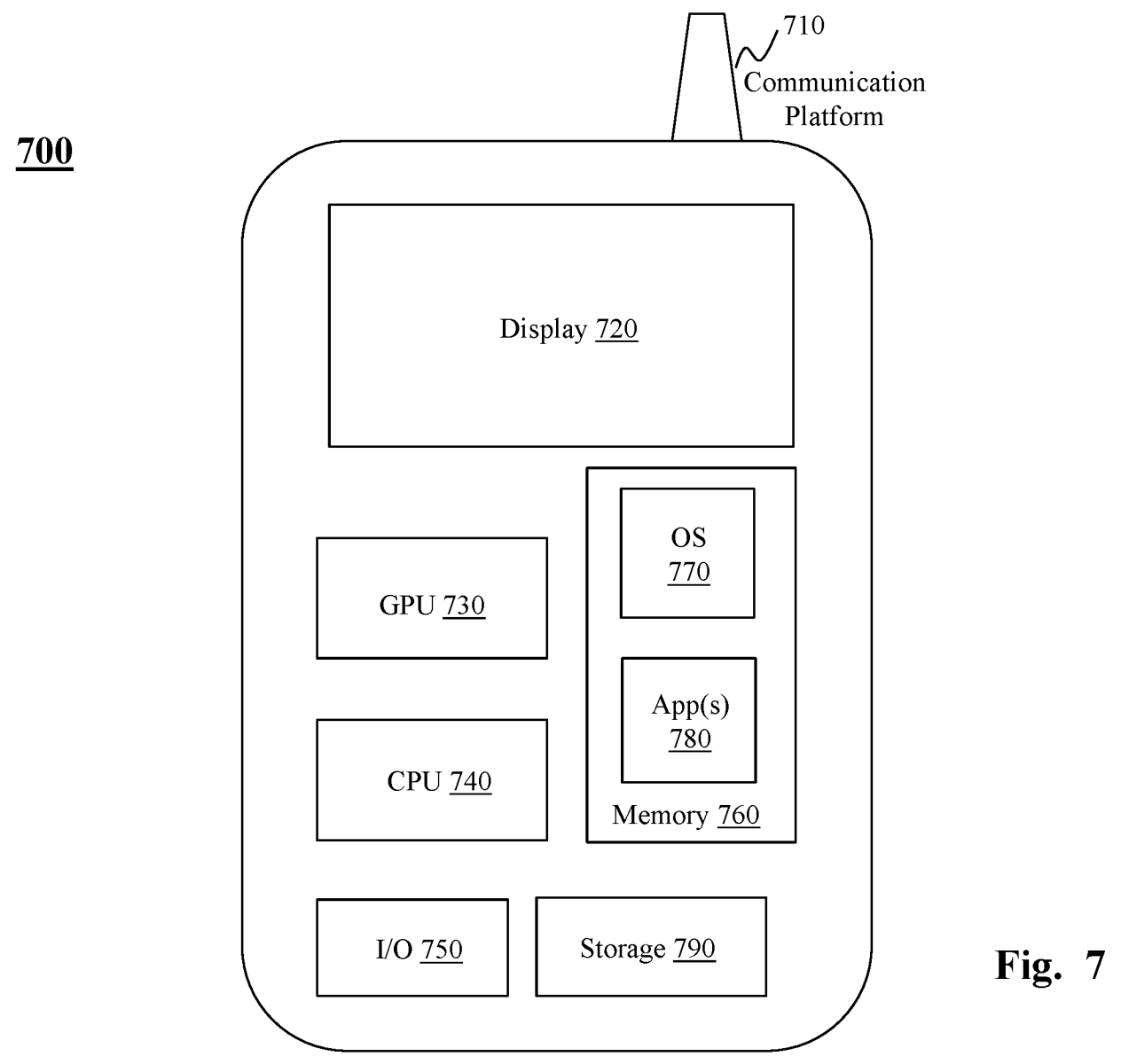

FIG. 7 is an illustrative diagram of an exemplary mobile device architecture that may be used to realize a specialized system implementing the present teaching in accordance with various embodiments. In this example, the user device on which the present teaching may be implemented corresponds to a mobile device 700, including, but is not limited to, a smart phone, a tablet, a music player, a handheld gaming console, a global positioning system (GPS) receiver, and a wearable computing device (e.g., eyeglasses, wrist-watch, etc.), or in any other form factor. Mobile device 700 may include one or more central processing units ("CPUs") 740, one or more graphic processing units ("GPUs") 730, a display 720, a memory 760, a communication platform 710, such as a wireless communication module, storage 790, and one or more input/output (I/O) devices 740. Any other suitable component, including but not limited to a system bus or a controller (not shown), may also be included in the mobile device 700. As shown in FIG. 7, a mobile operating system 770 (e.g., iOS, Android, Windows Phone, etc.), and one or more applications 780 may be loaded into memory 760 from storage 790 in order to be executed by the CPU 740. The applications 780 may include a browser or any other suitable mobile apps for managing a system according to the present teaching on mobile device 700. User interactions, if any, may be achieved via the I/O devices 740 and provided to the various components connected via network(s).

To implement various modules, units, and their function-alities described in the present disclosure, computer hard-ware platforms may be used as the hardware platform(s) for one or more of the components/elements described herein. The hardware elements, operating systems and program-ming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 8:
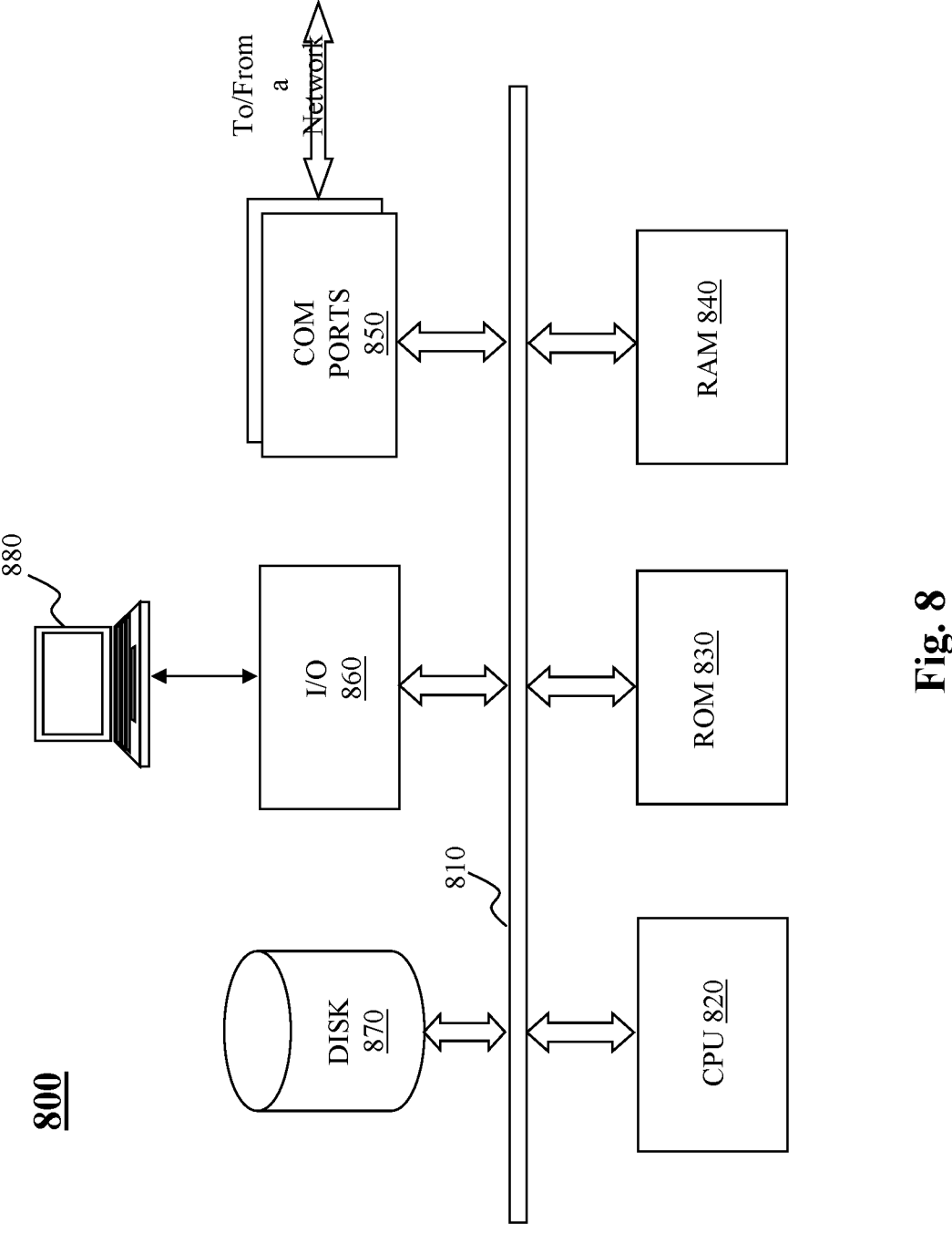
FIG. 8 is an illustrative diagram of an exemplary computing device architecture that may be used to realize a specialized system implementing the present teaching in accordance with various embodiments.

FIG. 8 is an illustrative diagram of an exemplary com-puting device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 800 may be used to imple-ment any component or aspect of the framework as dis-closed herein. For example, the system as disclosed herein may be implemented on a computer such as computer 800, via its hardware, software program, firmware, or a combi-nation thereof. Although only one such computer is shown, for convenience, the computer functions relating to the present teaching as described herein may be implemented in either a centralized or a distributed fashion on a number of similar platforms, to distribute the processing load.

Computer 800, for example, includes COM ports 850 connected to and from a network connected thereto to facilitate data communications. Computer 800 also includes a central processing unit (CPU) 820, in the form of one or more processors, for executing program instructions. The exemplary computer platform includes an internal commu-nication bus 810, program storage and data storage of different forms (e.g., disk 870, read only memory (ROM) 830, or random access memory (RAM) 840), for various data files to be processed and/or communicated by computer 800, as well as possibly program instructions to be executed by CPU 820. Computer 800 also includes an I/O component 860, supporting input/output flows between the computer and other components therein such as user interface ele-ments 880. Computer 800 may also receive programming and data via network communications.

Hence, aspects of the methods of dialogue management and/or other processes, as outlined above, may be embodied in programming. Program aspects of the technology may be thought of as "products" or "articles of manufacture" typi-cally in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be commu-nicated through a network such as the Internet or various other telecommunication networks. Such communications, for example, may enable loading of the software from one computer or processor into another, for example, in connec-tion with present teaching as disclosed herein. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one machine including at least one processor, memory, and communication platform capable of connecting to a network for identifying k-nearest neighbors (KNN) in clustering for unsupervised learning, the method comprising:

receiving, by a KNN server, from a plurality of distributed local join executors, a plurality of combined neighborhoods generated respectively by the corresponding distributed local join executors in parallel by:

generating neighbor pairs and reverse neighbor pairs based on one or more KNN lists corresponding to one or more source data points, grouping neighbor pairs and reverse neighbor pairs having a same source data point to generate a grouped pairs of neighbors for the source data point, and performing a local joint operation based on grouped pairs of neighbors for each of the one or more source data points to generate the combined neighborhood for the source data point;

obtaining, by the KNN server, a plurality of global KNN lists corresponding to a plurality of source data points, wherein each of the plurality of global KNN lists includes K neighbors to a corresponding source data point, each of the K neighbors is represented by an index of the neighbor and a distance between the source data point and the neighbor;

updating, by the KNN server, the plurality of global KNN lists to generate updated global KNN lists by replacing an existing neighbor included in one of the plurality of global KNN lists with an eligible candidate neighbor in a combined neighborhood of a corresponding source data point based on a distance between the source data point and the existing neighbor and a distance between the source data point and the eligible candidate neighbor of the source data point; and transmitting, by the KNN server, the updated global KNN lists to the plurality of distributed local join executors to improve scalability of clustering for unsupervised learning.

2. The method of claim 1, further comprising sending the updated global KNN lists to the plurality of distributed local join executors for generating updated combined neighborhoods for the plurality of source data points in a next iteration.

3. The method of claim 1, wherein the step of updating comprises:

for each of the global KNN lists for a source data point, identifying a corresponding combined neighborhood having pairs of eligible candidate neighbors of the source data point, identifying a neighbor in the global KNN list that has an existing distance larger than that in a pair of neighbors in the combined neighborhood, and repeating the steps of identifying a neighbor until no neighbor in the global KNN list with an existing distance larger than that in any pair of neighbors in the combined neighborhood exists.

4. The method of claim 3, further comprising:

determining a change count for each of the updated global KNN lists, wherein the change count represents a number of replacements made to the corresponding global KNN list; and transmitting the change count for each of the updated global KNN lists to facilitate a determination of whether to carry out the next iteration.

5. The method of claim 1, wherein the distance in each of the one or more pairs of neighbors in a combined neighborhood for a source data point is smaller than a maximum distance (maxDist) value, defined with respect to the source data point.

6. The method of claim 5, wherein the maxDist value relating to the global KNN list for the source data point corresponds to a maximum distance between the source data point to a neighbor in the global KNN list.

7. Machine readable and non-transitory medium having information recorded thereon for identifying k-nearest neighbors (KNN) in clustering for unsupervised learning, wherein the information, when read by the machine, causes the machine to perform the steps of:

receiving, by a KNN server, from a plurality of distributed local join executors, a plurality of combined neighborhoods generated respectively by the corresponding distributed local join executors in parallel by:

generating neighbor pairs and reverse neighbor pairs based on one or more KNN lists corresponding to one or more source data points, grouping neighbor pairs and reverse neighbor pairs having a same source data point to generate a grouped pairs of neighbors for the source data point, and performing a local joint operation based on grouped pairs of neighbors for each of the one or more source data points to generate the combined neighborhood for the source data point;

obtaining, by the KNN server, a plurality of global KNN lists corresponding to a plurality of source data points, wherein each of the plurality of global KNN lists includes K neighbors to a corresponding source data point, each of the K neighbors is represented by an index of the neighbor and a distance between the source data point and the neighbor;

updating, by the KNN server, the plurality of global KNN lists to generate updated global KNN lists by replacing an existing neighbor included in one of the plurality of global KNN lists with an eligible candidate neighbor in a combined neighborhood of a corresponding source data point based on a distance between the source data point and the existing neighbor and a distance between the source data point and the eligible candidate neighbor of the source data point; and transmitting, by the KNN server, the updated global KNN lists to the plurality of distributed local join executors to improve scalability of clustering for unsupervised learning.

8. The medium of claim 7, wherein the information, when read by the machine, further causes the machine to perform the step of sending the updated global KNN lists to the plurality of distributed local join executors for generating updated combined neighborhoods for the plurality of source data points in a next iteration.

9. The medium of claim 7, wherein the step of updating comprises:

for each of the global KNN lists for a source data point, identifying a corresponding combined neighborhood having pairs of eligible candidate neighbors of the source data point, identifying a neighbor in the global KNN list that has an existing distance larger than that in a pair of neighbors in the combined neighborhood, and repeating the steps of identifying a neighbor until no neighbor in the global KNN list with an existing distance larger than that in any pair of neighbors in the combined neighborhood exists.

10. The medium of claim 9, wherein the information, when read by the machine, causes the machine to further perform the steps of:

determining a change count for each of the updated global KNN lists, wherein the change count represents a number of replacements made to the corresponding global KNN list; and transmitting the change count for each of the updated global KNN lists to facilitate a determination of whether to carry out the next iteration.

11. The medium of claim 7, wherein the distance in each of the one or more pairs of neighbors in a combined neighborhood for a source data point is smaller than a maximum distance (maxDist) value, defined with respect to the source data point.

12. The medium of claim 11, wherein the maxDist value relating to the global KNN list for the source data point corresponds to a maximum distance between the source data point to a neighbor in the global KNN list.

13. A system for identifying k-nearest neighbors (KNN) in clustering for unsupervised learning, comprising:

a KNN list update controller implemented by a processor and configured for receiving, from a plurality of distributed local join executors, a plurality of combined neighborhoods generated respectively by the corresponding distributed local join executors in parallel by:

generating neighbor pairs and reverse neighbor pairs based on one or more KNN lists corresponding to one or more source data points, grouping neighbor pairs and reverse neighbor pairs having a same source data point to generate a grouped pairs of neighbors for the source data point, and performing a local joint operation based on grouped pairs of neighbors for each of the one or more source data points to generate the combined neighborhood for the source data point;

a KNN list updater implemented by a processor and configured for obtaining a plurality of global KNN lists corresponding to a plurality of source data points, wherein each of the plurality of global KNN lists includes K neighbors to a corresponding source data point, each of the K neighbors is represented by an index of the neighbor and a distance between the source data point and the neighbor, and updating the plurality of global KNN lists to generate updated global KNN lists by replacing an existing neighbor included in one of the plurality of global KNN lists with an eligible candidate neighbor in a combined neighborhood of a corresponding source data point based on a distance between the source data point and the existing neighbor and a distance between the source data point and the eligible candidate neighbor of the source data point; and a transmitter implemented by a processor and configured for transmitting the updated global KNN lists to the plurality of distributed local join executors to improve scalability of clustering for unsupervised learning.

14. The system of claim 13, further comprising an updated global KNN list transmitter implemented by a processor and configured for sending the updated KNN lists to the plurality of distributed local join executors for generating updated combined neighborhoods for the plurality of source data points in a next iteration.

15. The system of claim 13, wherein the KNN list updater updates the global KNN lists by:

for each of the global KNN lists for a source data point, identifying a corresponding combined neighborhood having pairs of eligible candidate neighbors of the source data point, identifying a neighbor in the global KNN list that has an existing distance larger than that in a pair of neighbors in the combined neighborhood, and repeating the steps of identifying a neighbor until no neighbor in the global KNN list with an existing distance larger than that in any pair of neighbors in the combined neighborhood exists.

16. The system of claim 15, further comprising a list-based change counter implemented by a processor and configured for:

determining a change count for each of the updated global KNN lists, wherein the change count represents a number of replacements made to the corresponding global KNN list; and transmitting the change count for each of the updated global KNN lists to facilitate a determination of whether to carry out the next iteration.

17. The system of claim 13, wherein the distance in each of the one or more pairs of neighbors in a combined neighborhood for a source data point is smaller than a maximum distance (maxDist) value, defined with respect to the source data point, and the maxDist value relating to the global KNN list for the source data point corresponds to a maximum distance between the source data point to a neighbor in the global KNN list.

\* \* \* \* \*